(12) United States Patent
Kirschner

(10) Patent No.: US 6,187,277 B1
(45) Date of Patent: Feb. 13, 2001

(54) METHOD FOR PURIFYING GASES

(76) Inventor: Leon Kirschner, 7650 Lavergne Ave., Skokie, IL (US) 60077-2843

(*) Notice: Under 35 U.S.C. 154(b), the term of this patent shall be extended for 0 days.

(21) Appl. No.: 09/325,955

(22) Filed: Jun. 4, 1999

(51) Int. Cl.[7] .......................... B01D 53/50; B01D 53/62
(52) U.S. Cl. .................. 423/220; 423/226; 423/242.1; 423/243.01; 423/243.08; 423/430; 423/554; 423/555
(58) Field of Search .................. 423/242.2, 243.01, 423/555, 554, 519.2, 430, 220, 226, 243.08; 95/236, 235

(56) References Cited

U.S. PATENT DOCUMENTS

| | | | |
|---|---|---|---|
| 1,363,992 | * 12/1920 | Payne | 423/230 |
| 3,538,681 | * 11/1970 | Cantrell et al. | 55/48 |
| 3,733,781 | * 5/1973 | Bellisio et al. | 55/73 |
| 4,100,257 | * 7/1978 | Sartori et al. | 423/226 |
| 4,157,379 | * 6/1979 | Arika et al. | 423/430 |
| 4,528,002 | * 7/1985 | Linde | 55/48 |

OTHER PUBLICATIONS

Kohl et al. *Gas Purification* 4th Ed. Gulf Publishing Co. Houston TX; ISBN 0-87201-314-6, pp. 307-320, 1985.*

* cited by examiner

Primary Examiner—Steven P. Griffin
Assistant Examiner—Timothy C Vanoy
(74) Attorney, Agent, or Firm—Emrich & Dithmar

(57) ABSTRACT

A method is provided for removing sulfur dioxide and carbon dioxide out of gases from, for example, the combustion of sulfur containing fossil fuels. The sulfur dioxide and carbon dioxide contaminated gas is first contacted with an aqueous solution containing dimethyl sulfoxide and alkaline earth metal ions, wherein the aqueous solution is at an acidic pH, for example, at a pH of from about 2 to about less than 7, so that the sulfur dioxide in the gas is dissolved in the aqueous solution and, subsequently, reacts with the alkaline earth metal ions to form alkaline earth metal sulfates and alkaline earth metal sulfites. The gas is then contacted with an aqueous solution containing dimethyl sulfoxide and alkaline earth metal ions, wherein this aqueous solution is at a pH that is greater than 7 so that the carbon dioxide in the gas is dissolved in the aqueous solution and, subsequently, reacts with the alkaline earth metal ions to form alkaline earth metal carbonates. The alkaline earth metal sulfates/sulfites and alkaline earth metal carbonates are separated from the solution. The source of the alkaline earth metal ions may be from cement waste or limestone.

23 Claims, 2 Drawing Sheets

METHOD FOR PURIFYING GASES

TECHNICAL FIELD

This invention relates to reduction of sulfur and $CO_2$ emissions from the stack gases from fossil fuel fired boilers.

BACKGROUND OF THE INVENTION

The reliance on fossil fuels, particularly coal, for the foreseeable future by the power utility and industrial sections (e.g. iron, steel and cement making) of our economy and the US' commitment to a clean environment will require vigilant waste management of $SO_2$, $CO_2$ and $NO_x$.

Sulfur dioxide is a distinctly ubiquitous gas pollutant in that it is of consequence as a toxic gas in industrial gases as well as the general atmosphere and therefore of public health importance. While sulfur dioxide discharge occurs as consequence of the combustion process primarily from the burning of sulfur-containing fossil fuels, petroleum refining, manufacturing of sulfuric acid and smelting of sulfur containing ores also contribute to the sulfur dioxide atmospheric inventory. The major origin of sulfur dioxide is from sulfur bearing coals burned in the process of producing electrical energy. The magnitude of this pollution source can be realized as over 900 million tons of coal was consumed in 1997 (Electric Power Monthly, October 1998, US Energy Information Administration, Table 14). Sulfur dioxide's impact ecologically is seen as the cause of acid rain. As such, it is responsible for damage to agricultural crops and the despoiling of natural lakes and the wildlife dependent on such resources throughout the world, notably in the US and Canada.

Carbon dioxide, until recently, was a gas that had been viewed to be at most 1) a benign consequence of the combustion of carbon bearing compounds, primarily coal and 2) even a desirable end product of the incinerator control of undesirable organic and volatile compound emissions. This view has been radically altered within the last decade as a result of long range studies of the origins of global warming which appears to be a consequence of the growing volume of greenhouse gases, primarily carbon dioxide, being generated worldwide. Changes in the permafrost are postulated as proof of this change. In the May 1, 1998 Report of the Council of Economic Advisors, Dr. Janet Yeltin, its chairperson addressed the seriousness of this problem. Dr. Yeltin projected that the recommendations of the Kyoto Protocols on international commitments to reduce present day carbon dioxide emissions generated by fossil fuels combustion (particularly coal) by the US to 1990 levels would cost between $70–110/household. As this cost would be borne by 98 million households, the financial outlay can be seen as enormous. Translating this projection into meaningful data: 773 million tons of coal were consumed for electrical energy generation in 1990 and 900 million tons in 1997. Two Hundred pounds per hour of $CO_2$ are generated from every 90 lbs. of coal consumed to create 1 million BTU of energy. This is approximately a 14% reduction in emission output. It is these considerations which make desirable a tandem scrubber design to reduce not only sulfur dioxide levels to 1.2 lbs./million BTU (520 nanograms/J heat input) or less as well as the carbon dioxide levels to those found at the 1990 level of coal consumption.

Another problem faced by many states with high sulfur coal, such as Illinois, is that they have limited commercial outlets for their coal. The mandate to remove both sulfur dioxide and carbon dioxide from the emission stream creates an opportunity for this technology and methodology to create new jobs in both the coal and construction industry.

Although DMSO has been widely used in biomedical applications, its use in clean air technologies is novel and, as such, DSMO has not been seriously considered as a factor in the removal of sulfur dioxide in environmental research involving the prevention and control of sulfur dioxide emissions in fossil fuel combustion. Flue gas emission research dealing with the removal of carbon values subsequent to the complete removal of sulfur dioxide (with DMSO or otherwise) is not widely reported in the literature and is certainly not a common place practice in the utility or manufacturing industries.

SUMMARY OF THE INVENTION

I have found that combustion gases from coal fired boilers containing both sulfur oxide and carbon oxides can be remedied using dimethyl sulfoxide, hereafter DMSO, and calcium ions obtained from cement waste materials and other common raw materials. I further have found that by controlling the pH of an aqueous DMSO solution, sulfur values and carbon values can be sequentially removed while preserving the DMSO for additional use. An important difference between the inventive process and prior art uses of DMSO is the inventive process makes use of chemical separation requiring the presence of ions for chemical reaction. Accordingly, aqueous solutions of DMSO are employed to provide ions for the chemical reactions with the sulfur and carbon dioxide values, preferably as calcium salts with the calcium ions being provided by commonly available materials, such as waste cement or naturally occurring limestone.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

The chemistry should be optimized to (1) maximize $SO_2$ removal, (2) avoid scaling (solid precipitation in the scrubber), and (3) maximize the utilization of the scrubbing slurry. The first two objectives are met by providing two separate vessels (scrubber and effluent hold tank), and the third objective is met by proper pH control and by using finely ground solid and a sufficiently high liquid (L) to gas (G) ratio. The magnitude of the $SO_2$, mass transfer (from gas to liquid) is determined from the following equations (equation 1 describes the relationship between the gas-liquid surface using Henry's laws).

$$P_{(SO2)i} = H_{So2}C_{(SO_2)i}$$

$$\frac{N}{A} = k_g(P_{SO2} - P_{(SO2)i})$$

$$\frac{N}{A} = \varphi k_1(C_{(So)i} - C_{SO2})$$

-continued $$\frac{N}{A} = K_g(P_{SO2} - H_{SO2}C_{SO2})$$

$$\frac{1}{K_g} = \frac{1}{k_g} + \frac{H_{SO2}}{\varphi k_l}$$

In these equations, C represents the liquid-phase concentration, $H_{SO2}$ is Henry's Law constant, and $P_{SO2}$ is the gas phase concentration. The major parameters to be estimated for the proposed scrubbing system are: N/A or flux of $SO_2$ (mol/s.cm$^2$), local mass transfer coefficients ($k_g$ and $K_1$), overall gas phase mass transfer coefficient Kg, and enhancement factor $\phi$ to account for chemical reactions that permit $SO_2$ to diffuse through the liquid film.

Depending on several parameters, the enhancement factor can have a wide range of values. For an enhancement factor greater than 20, the gas phase resistance controls the overall mass transfer rate. When, however, the enhancement factor is smaller than 20, both gas and liquid phase resistance are important. In addition, it has been shown that the enhancement factor increases as the pH, alkali species, and buffer activity of the slurry increases.

Figure 1:
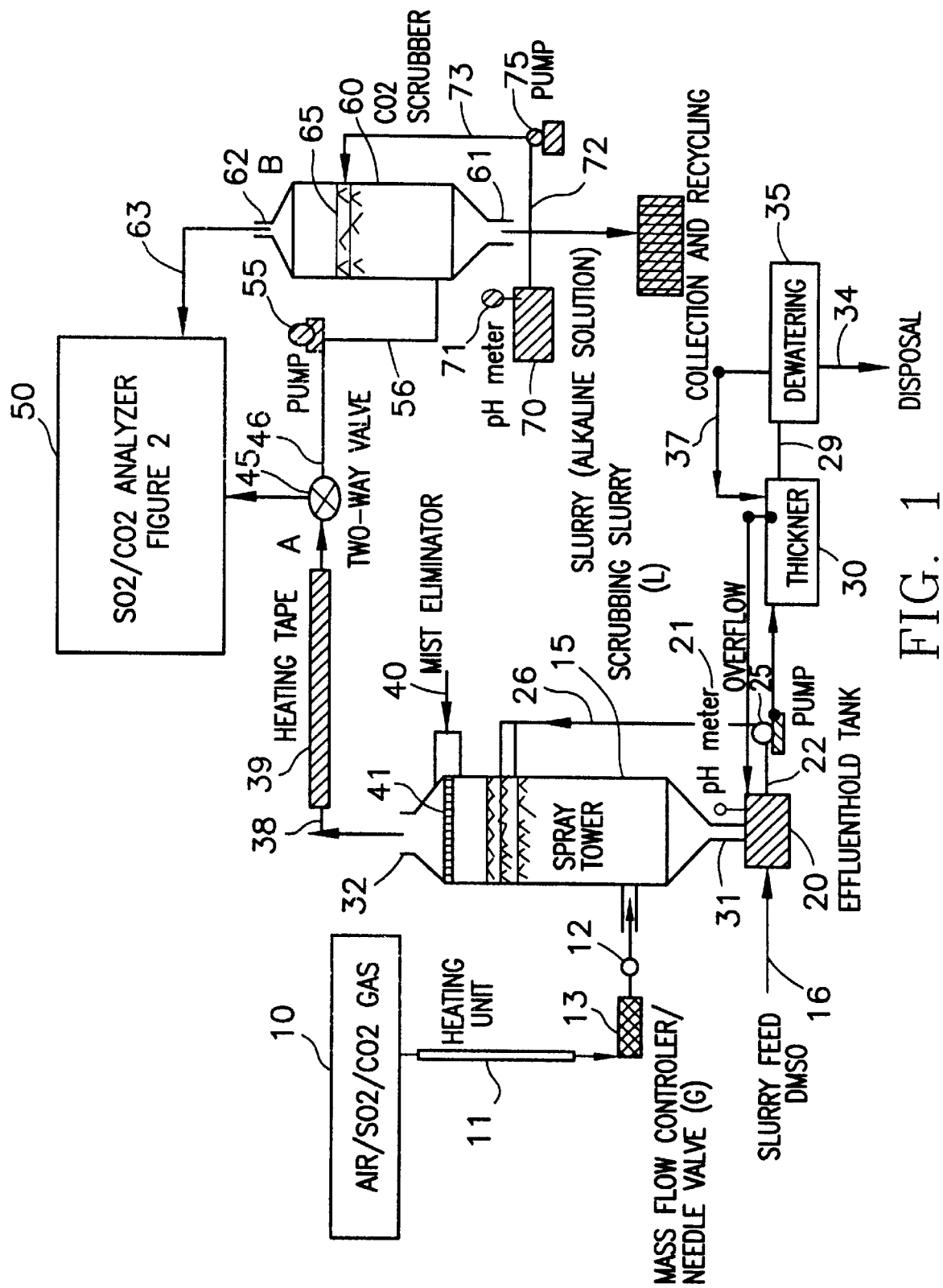
FIG. 1 is a schematic view of the experimental procedure.

A system for utilizing DMSO in removing sulfur dioxide and thereafter carbon dioxide from gaseous phase emission streams is shown schematically in FIG. 1:

Gas streams containing different volumetric ratios of $SO_2/CO_2$ from $SO_2$ and $CO_2$ tanks 10 that can supply gas streams of $SO_2$, air and $CO_2$ with 99.998% purity flow through a heater.

All of the flows are controlled by micrometering valves (not shown), and measured using mass flow controller 13 before reaching an on/off valve 12. The most significant process, scrubbing is conducted in a spray tower such as manufactured by Air Pollution Control Systems, Inc. The desired gas temperature of about ambient to about 100° C. is maintained by controlling an external heater 11 with a variable voltage transformer and an internal heater with a temperature controller (not shown). A thick bed of glass beads as is well known in the art is packed upstream of the fed sample layer to improve heat transfer and uniformity of flow. Two types of K thermocouples contact the sample to record the temperature. The flow of the gas is controlled using mass flow controller 13

A slurry feed line 16 connects a source of slurry consisting of water, DMSO and a source of calcium ions, (such as from waste concrete or cement), to an effluent holding tank 20. The effluent holding tank 20 is provided with a pH meter 21 and an exit line 22 leading to a pump 25. The pump 25 pumps a portion of the material or slurry in the affluent holding tank 20 through line 26 to the top of the spray tower 15 where the slurry falls through the tank 15 and contacts the air, sulfur dioxide, carbon dioxide gas from the source 10 thereof as the gas moves upwardly through the spray tower 15 to effect a counter current relationship between the gas and the slurry. The pump 25 also is connected to a line 27 connected to a thickener 30 which receives slurry from the tank 25 through an exit portion 31 and can treat it by means of a dewatering mechanism 35 which directs water through a line 36 to a sewer system for disposal or to a treatment plant before the water is released from the system. An inline recovery system for waste by-products may be alternately used. A line 28 from the thickener 30 returns slurry to the holding tank 20 for additional use. The thickener 30 and the dewatering vessel 35 are connected by a line 29 from the thickener to the dewatering vessel and a return line 37 connects the dewatering vessel to the thickener 30.

Near the top of the spray tower 15 is a mist eliminator 40 in the form of a plate 41 which causes any mist in the outflowing gases from the spray tower 15 to condense and fall toward the bottom of the spray tower 15, while the gases flow toward the exit 32 at the top of the spray tower 15 to a conduit 38 around which is wrapped a heating tape 39 or 63. A two-way valve 45 can direct the off-gases from the spray tower 15 either to a $SO_2$—$CO_2$ analyzer device 50 as hereinafter explained or to a line 46 in communication with a pump 55 which is connected via line 56 to a $CO_2$ scrubber 60.

The $CO_2$ scrubber 60 has outlet 61 and an off-gas outlet 62 at the top. A mist eliminator 65 is located near the top of the $CO_2$ scrubber. Slurry which is made alkaline in a manner hereinafter set forth, is held in a slurry holding tank 70 in communication with the pH meter 71 connected by a line 72 to a pump 75. Slurry is sent from the pump 75 to line 73 to the top of the $CO_2$ scrubber 60 where it trickles downwardly in countercurrent relationship with the gas entering the $CO_2$ scrubber 60 via line 56. The off-gas exits the scrubber 60 through the outlet 62 and is conducted via line 63 to the analyzer 50. The $CaCO_3$ precipitate flows through the outlet 61 to a tank 70a for eventual disposal.

The concentrations of the $SO_2$ and $CO_2$ will be determined in analyzer 50 using procedures similar to those outlined in EPA Method 6A (Determination of Sulfur Dioxide, Moisture, and Carbon Dioxide Emissions from Fossil-Fuel Combustion Sources) as set forth in 40 CFR 60. This method will be used to determine sulfur dioxide ($SO_2$) emissions concentration (mg/dscm) and carbon dioxide ($CO_2$) concentration (volume percent). This method is applicable for the determination of $SO_2$ emissions with detectable level of 3.4–80,000 mg of $SO_2/m^3$ of gas volume. The reported precision of this method for a 20 liter sample is about 0.5 percent $CO_2$ for concentration between 2.5 and 25 percent $CO_2$, and 1.0 percent moisture for moisture concentrations greater than 5 percent.

The principle of sample collection will be the same as that for Method 6 except that moisture and $CO_2$ will be collected in addition to $SO_2$ in the sample sampling train. Moisture and $CO_2$ fractions are determined gravimetrically.

Figure 2:
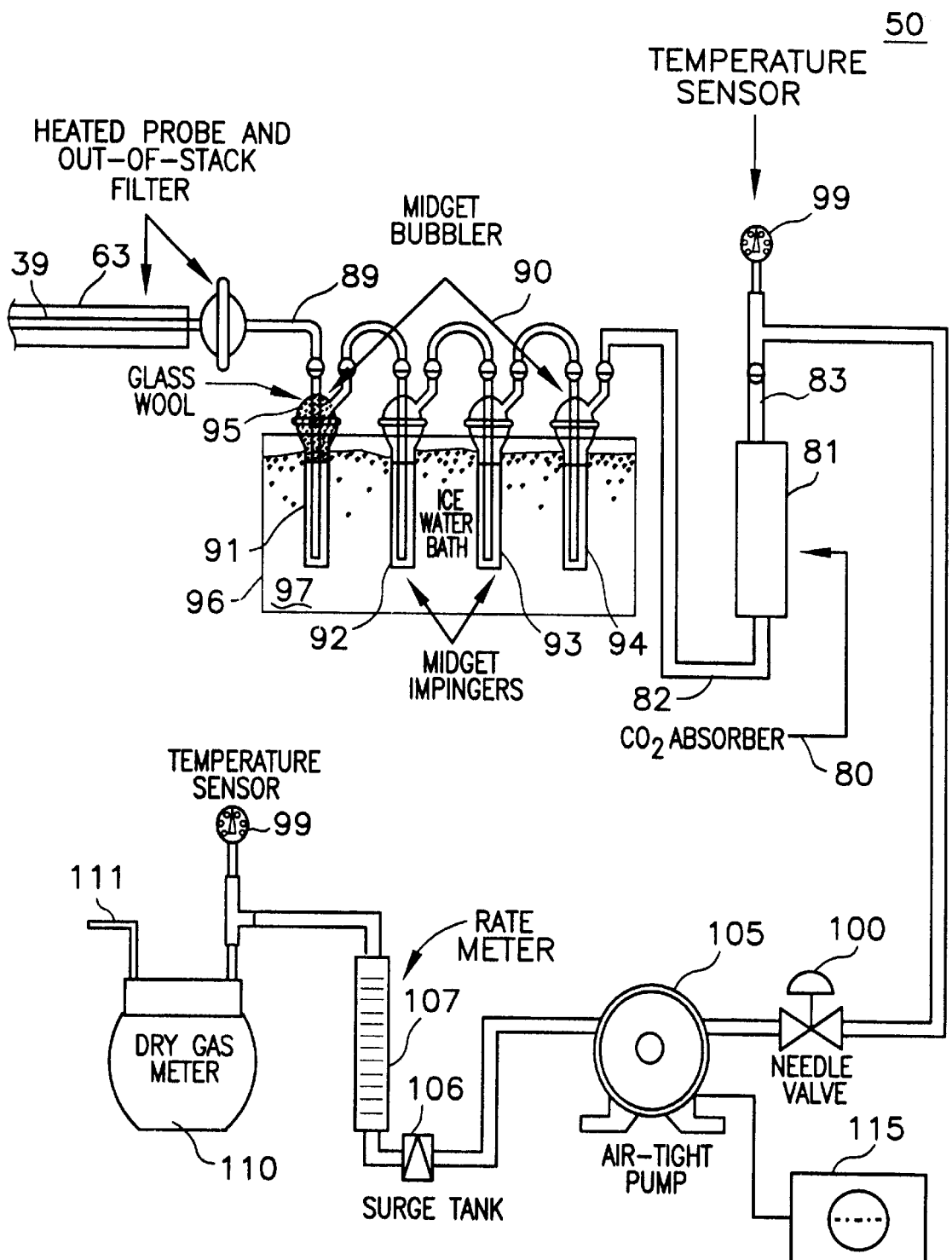
FIG. 2 is a schematic of the sampling method for $SO_2$ and $CO_2$.

The sampling train is similar to that shown in FIG. 2. $SO_2$ absorbers include two 30-ml midget impingers with a 1-mm restricted tip and two 30-ml midget bubblers with an unrestricted tip. (EPA Method 6A suggests that other types of impingers and bubblers, such as Mae West for $SO_2$ collection and rigid cylinders for moisture absorbers containing Drierite, may be used with proper attention to reagent volumes and levels). The $CO_2$ absorber 80 consists of a sealable rigid cylinder 81 or bottle with an inside diameter between 30 and 90 mm and a length between 125 and 250 mm and with appropriate connections at both ends. Particularly, an inlet 82 and an outlet 83 from the top of the cylinder 81. The filter may be a separate heated unit or may be within the heated portion of the probe. If the filter is within the sampling probe, the filter should not be within 15 cm of the probe inlet or any unheated section of the probe, such as the connection to the first $SO_2$ absorber. The filter temperature (i.e. the sample gas) is monitored to assure the desired temperature is maintained). A heated Teflon connector connects the filter holder or probe to the first impinger. The equipment needed for sample recovery and analysis is the same as that required for EPA method 6. In addition, a balance to measure within 0.05 g is needed for analysis. All reagents will preferably conform to the specifications established by the Committee on Analytical Reagents of the American Chemical Society. The reagents required for sampling are the same as that specified in Method 6. In addition, the following reagents are required: anhydrous calcium sulfate ($CaSO_4$) desiccant, 8 mesh, and Ascarite II; sodium hydroxide coated silica, 8 to 20 mesh for $CO_2$ adsorption. Returning to FIG. 2, where is also included in the sampling loop. The $CO_2$ absorber 80 is connected as indicated to the inline 82 which exits from a midget bubbler 90. The midget bubbler 90 is the usual configuration in which a number of flow through vessels 91, 92, 93 and 94 are connected in series, each provided with a suitable filtering medium such as glass wool 95. The midget impingers 91–94 are maintained in a bath 96 which is filled with ice water or other coolant 97. The off gas from the conduit 38 and the heating tape 39 or 63 flows through the conduit 89 into the first of the midget impingers 91 and thereafter serially through each of the impingers to the outflow conduit 92 which is the inlet into the $CO_2$ absorber 80. Gas exiting from the $CO_2$ absorber 80 through line 83 then flows to a needle valve 100, a pump 105 and eventually to a gas meter 110. A temperature sensor 99 is placed in the exit line 83 from the $CO_2$ absorber 80 and a search tank is connected downstream of the surge tank 106 is positioned downstream of the pump 105 intermediate the pump 105 at a rate meter 107. Another temperature sensor 99 is positioned in the line between the rate meter 107 and the dry gas meter 110 and exit line from the dry gas meter 110 and exist line 111 extend from the dry gas meter 110.

Finally, a timer 115 is connected to the pump 105 for automatic sampling action. Accordingly, it is seen that sampling of the off gas from the system may be accomplished in either of two ways: in one way, the $SO_2$, $CO_2$ analyzer system of 50 may be employed for the gas exiting the spray tower 15 by means of the two way valve 45, or alternatively, the analyzer 50 may be used in he off gases 63 from the spray tower 60.

Sampling Procedure

A. 15 ml of 80 percent isopropanol is added into the first midget bubbler and 15 ml of 3 percent hydrogen peroxide into each of the first two midget impingers as described in Method 6. The glass wool is inserted into the top of the isopropanol bubbler as shown in FIG. 2. About 25 g of Drierite is placed into the fourth vessel in the train, the second midget bubbler. The bubblers and impingers are cleaned, dried, and weighed at room temperature (20° C.) to the nearest 0.1 g. The four vessels are weighted simultaneously; initial mass is recorded.

B. With one end of the $CO_2$ absorber sealed, glass wool is placed in the cylinder to a depth of about 1 cm. about 150 g of $CO_2$ absorbing material is placed in the cylinder on top of the glass wool, and the remaining space in the cylinder will be filled with glass wool. The $CO_2$ absorbing material remains in position and no open spaces or channels are formed. If necessary, ore glass wool is packed into the cylinder to make the $CO_2$ absorbing material stable. The outside of the cylinder is cleaned and then it is weighed at room temperature to the nearest 0.1 g.

C. The sampling train is assembled as follows: the probe is adjusted to a temperature sufficient to prevent condensation, crushed ice and water is placed around the impingers and bubblers. The $CO_2$ absorber is mounted outside the water bath in a vertical flow position with the sample gas inlet at the bottom. Flexible tubing, e.g., Tygon, connects the last $SO_2$ absorbing bubbler to the Drierite absorber and connects the Drierite absorber to the $CO_2$ absorber. A second, smaller $CO_2$ absorber containing Ascarite II may additionally be added in line downstream of the primary $CO_2$ absorber as a breakthrough indicator. Ascarite II turns white when $CO_2$ is absorbed.

D. Moisture Measurement. First the isopropanol bubbler, the $SO_2$ impingers, and the moisture absorber is disconnected from the sample train. After about 10 minutes they are cleaned, dried and weighed simultaneously. Their mass is recorded.

E. Peroxide Solution. The contents of the isopropanol bubbler is discarded (the contents of the midget impingers pours into a leak-free polyethylene bottle). The two midget impingers and connecting tubes are also washed with water.\

F. $CO_2$ Absorber. The $CO_2$ absorber is allowed to warm to room temperature (about 10 minutes), the outside of loose dirt and moisture is cleaned, and c) then weighed to the nearest 0.1 and recorded. Used Ascarite II material to be discarded.

G. Sample Analysis. The sample analysis procedure for $SO_2$ is the same as that specified in Method 6. The calibration and checks are the same, as that required in Method 6, Section 5.

CALCULATIONS

Our calculations assume:

$C_w$=concentration of moisture, percent.

$C_{CO2}$=concentration of $CO_2$, dry basis, percent.

$m_{wi}$=initial mass of impingers, bubblers, and moisture absorber, g.

$m_{wf}$=final mass of impingers, bubblers, and moisture absorber, g.

$m_{ai}$=initial mass of $CO_2$ absorber, g.

$m_{af}$=final mass of $CO_2$ absorber, g.

$V_{CO2(std)}$=Equivalent volume of $CO_2$ collected at standard conditions, dscm.

$V_{w(std)}$=Equivalent volume of moisture collected at standard conditions, scm.

$CO_2$ Volume Collected, Corrected to Standard Conditions.

$$V_{CO2(std)}=5.547\times10^4(m_{af}-m_{ai})$$

Where:

5.467×10$^{-4}$=Equivalent volume of gaseous $CO_2$ at standard conditions per gram, scm/g.

Moisture Volume Collected, Corrected to Standard Conditions. $V_{w(std)}=1.336\times10^{-3}(m_{wf}-m_{wi})$ Where:

1.336×10$^{-3}$=Equivalent volume of water vapor at standard conditions per gram, scm/g $$(V_t - V_{tb})N\left[\frac{V_{soln}}{V_a}\right]$$

$SO_2$ Concentrations.

$$C_{co2} = \frac{V_{co2(std)}}{V_{m(std)} + V_{co2(std)}} \times 100$$

$CO_2$ Concentration.

$$C_{co2} = \frac{V_{co2(std)}}{V_{m(std)} + V_{co2(std)}}$$

Moisture Concentration.

$$C_w = \frac{V_{w(std)}}{V_{m(std)} + V_{w(std)} + V_{co2(std)}}$$

It is known that the removal of sulfur from coal can be accomplished before or after it is combusted with air. Technologies leading to its removal prior to combustion, such as the dry magnetic separation of pyritic sulfur (U.S. Pat. No. 5,107,283) have not gained much industry support because of their limited application. Post-combustion approaches are widely reported (see Clean Coal Technology Demonstration program, Program Update (1996–97, US DOE). While there have been many methodologies and technologies offered for sulfur dioxide removal from emission gases, the three basic approaches for sulfur dioxide focus on and obtain their success to a significant degree from mechanical/physical engineering modifications in the "scrubbing" process. These approaches arec: 1) Sorbent injection systems 2) Gas suspension-absorption systems and 3) advanced flue gas desulfurization systems (AFGD). Of the se approaches (processes), the AFDG system is the most efficient (90–98% under certain conditions). This process requires that calcium containing particles ($CaCO_3$) involved in the process that are recycled have a large surface area allowing it to be converted to gypsum.

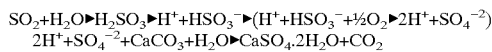
$SO_2+H_2O \blacktriangleright H_2SO_3 \blacktriangleright H^+ + HSO_3^- \blacktriangleright (H^+ + HSO_3^- + \frac{1}{2}O_2 \blacktriangleright 2H^+ + SO_4^{-2})$
$2H^+ + SO_4^{-2} + CaCO_3 + H_2O \blacktriangleright CaSO_4 \cdot 2H_2O + CO_2$ In the present invention the chemistry involved, i.e. interaction of sulfur dioxide and calcium containing products, has been approached from an entirely different and novel approach: dimethyl sulfoxide (DMSO) is used to facilitate the creation of sulfites and sulfates of calcium.

Sulfur dioxide is readily soluble in water. One volume of water at 15° C. (59° F.) dissolves 45 volumes of sulfur dioxide (1 liter of water dissolves 128 grams of sulfur dioxide or 12.8% w/w). The aqueous solution contain s molecules of sulfur dioxide, $SO_2$—$6H_2O$, sulfurous acid ($H_2SO_3$). The acid can not be isolated, as it decomposes into water and sulfur dioxide one vaporation, therefore the free acid exists only in an aqueous solution. Sulfurous acid is an acid of moderate strength having a primary ionization constant of $1.7 \times 10^{-2}$ and a secondary ionization constant of $1.0 \times 10^{-7}$. By neutralization with alkali hydroxides (e.g., sodium hydroxide), comparatively stable sulfite salts can be formed. In solution, sulfites are gradually oxidized to sulfate by dissolved oxygen.

Alkali sulfites (Na, K, etc.) are readily soluble in water. Other sulfites are sparingly or insoluble in water. On reacting sulfurous acid with a soluble calcium salt (calcium chloride which is insoluble in DMSO), an insoluble calcium sulfite ($CaSO_3$) molecule is formed. While the sulfites of the alkaline earth metals vary in their solubilities in sulfurous acid, calcium sulfite readily dissolves in an excess of sulfurous acid forming calcium bisulfite.

The properties of DMSO are described:
1. DMSO $\{(CH_3)_2\ SO)\}$ is an organic liquid desiccant miscible with water in all proportions. It is capable of dissolving sulfur dioxide gas up to 57% of its weight (approximately 5.5 lbs. $SO_2$/Gallon DMSO). DMSO can be considered as a "reaction solvent."
2. No chemical reaction or physical change occurs when $SO_2$ gas is added to a solution containing DMSO. DMSO is capable of being recovered unchanged when required.
3. Calcium chloride ($CaCl_2$) and calcium hydroxide ($CaOH_2$) are sparingly or insoluble in an aqueous solution of DMSO.
4. The sulfites and sulfates of calcium are insoluble in DMSO or an aqueous solution of DMSO.

Thus, the presence of DMSO in a solution of sulfur dioxide gas in an aqueous medium provides a means for taking up sulfur dioxide with an unusual efficiency by controlling its removal from the reaction as an insoluble precipitate in a two step sequenced system. This process will lead to:

a. The removal of sulfur dioxide and retention in the DMSO.
b. The release of sulfur dioxide to $H_2O$ in the solution to form sulfite ions, which are then, precipitated as insoluble sulfite salts, which end the reaction.

The interaction of sulfur dioxide and DMSO in an aqueous medium may be depicted by the following sequence.

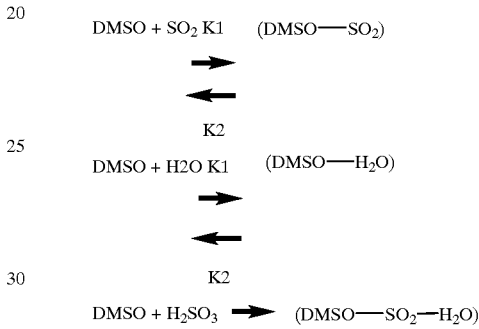

The following equation illustrates the proposed role played by DMSO in influencing this reaction:

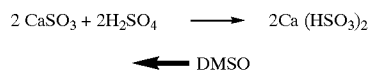

The formation of soluble Ca $(HSO_3)_2$ is inhibited by the presence of DMSO which in limiting the formation of excess $H_2SO_3$ dehydrates the $H_2SO_3$ to ($SO_2+H_2O$-DMSO) thereby moving the reaction to the left which favors the formation and integrity of insoluble $CaSO_3$. Of the alkaline earth salts, calcium sulfite is the most soluble in water (at 18° C.). One gram of calcium sulfite dissolves in 800 ml of water.

A reaction of importance, one which may also influence the selection of the alkaline earth metal, can be employed in the present process is the following:

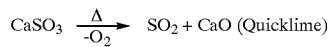

In this reaction, calcium sulfite is heated in the absence of air (oxygen) to dry off sulfur dioxide and leave CaO (Quicklime). This process can be used to recover CaO should that be of value. Quicklime in contact with water produces calcium hydroxide in an exothermic reaction.

Slaked lime is much less soluble than either barium or strontium hydroxide. By employing a closed system process, exposure to personnel is precluded. Similarly, there is no contamination of the atmosphere, land or water.

At this point in the process only carbon dioxide and water vapor are of concern. For purposes of this experiment, the oxides of nitrogen were not introduced. The greatest quantity of gas generated in the complete oxidation of fossil fuel, which may or may not contain sulfur, is carbon dioxide. Carbon dioxide is derived in the case of coal from the oxidation of carbon either as the element or as the element in an organic component. The latter is true particularly of oil and gas fuels. The principal reaction responsible for the formation of carbon dioxide is:

$$C+O_2 \rightarrow CO_2$$

The presence of carbon dioxide in the present alkaline earth DMSO scrubbing process prevents the precipitation of insoluble carbonates since the system is maintained at an acid pH by the presence of buffer systems consisting of $Na_2SO_3$ and $H_2SO_3$ and $H_2CO_3$ and $Na_2CO_3$. Also, the DMSO system has a pH of about 5.0. $Na_2SO_3+H_2SO_3$, $Na_2CO_3+H_2CO_3$ are the salts of weak acid and strong base in the presence of weak acid.

My preliminary work showed that in the DMSO-alkaline earth metal system (containing carbonates) when acidified with HCl to pH 4.5 will discharge $CO_2$ as a gas (indicating the instability of carbonates) whereas sulfites will precipitate out as insoluble sulfites. The presence of $CO_2$ therefore does not interfere with the $SO_2$ removal process. Its presence also provides a continuous $CO_2$ fire retardant atmosphere to add an additional significant safety factor to the use of the organic liquid DMSO.

The removal of carbon dioxide is completed in a second wet scrubber utilizing a dolomite (or waste cement) slurry in an alkaline environment. As carbon dioxide enters the wet scrubber, the following reaction occurs:

$$CO_2 + H_2O \leftrightarrow H_2CO_3$$

In the presence of the available $[Ca^{+2}]$ ions $$Ca^{+2} + 2 HCO_3^{-1} \dashrightarrow Ca(HCO_3)_2 \xrightarrow{H_2O + O_2} CaCO_3 + 2H_2O$$

The calcium carbonate precipitates (Ksp=$1\times10^{-12}$) out of solution thus removing the carbon. This reaction is well known.

The results indicated that when DMSO is added to the supernatant, the quantity of calcium ions that precipitate out in the form of sulfur containing salt is increased by 50%. Almost 100% removal of sulfur dioxide was observed.

1. A gas stream consisting of 100% sulfur dioxide gas was dispersed through a 10% aqueous solution of DMSO in a one liter 2-hole closed container which contained a suspension of calcium chloride to which a solution of sodium hydroxide had been added to obtain a final pH in the range of about 4.5 to about 6.5. Calcium salts were obtained from slurries from:

a. Dolomite (limestone) slurry
 b. The waste washings from local cement manufacturers.

The slurry was made from 500 gram of solid diluted to 1500 cc of volume with water (33% wt/vol.) The contact time was 4.5 seconds. The flow rate of 25 cc/min. through the dispersion tube.

2. The sulfur dioxide gas taken up by the DMSO forms both sodium sulfite and sulfurous acid by the reaction of sulfur dioxide with sodium hydroxide and water.

3. In the presence of calcium ion, the sulfite ions ($SO_3^{-2}$) that were present precipitate out as insoluble calcium sulfite.

4. The DMSO solubilizes and retains the sulfur dioxide (gas) but does not react with this gas. The sulfur dioxide, which goes into solution to form sulfurous acid, is partially removed by the DMSO. DMSO also acts as a dehydrating or desiccating agent thus moving the reaction (partition) of sulfurous acid ($H_2SO_3$) to $SO_2$ and $H_2O$.

5. By retaining the sulfur dioxide and water, the DMSO permits the formation of sulfite ions from the neutralization of sulfurous acid and sodium hydroxide. DSMO augments the precipitation of calcium ions (in a salt form) at an optimum rate for reaction and prevents an excess of sulfur dioxide to pass through the reaction scrubber with its conversion to insoluble calcium precipitate. The controlling precipitation agent is the presence of adequate ionizable calcium compounds.

6. The gases bubbling out of the solution were then passed through a 2% $KMnO_4$ solution to evaluate for residual sulfur dioxide concentration. No change in the color $KMnO_4$ was ever noted indicating no creation of hydrogen ions resulting from a possible reaction of residual sulfur dioxide (gas) with water, thus indicating the removal of $SO_2$ to the limits of the testing equipment.

While there has been disclosed what is considered to be the preferred embodiment of the present invention, it is understood that various changes in the details may be made without departing from the spirit, or sacrificing any of the advantages of the present invention.

I claim:

1. A method of removing $SO_2$ from a gas, comprising contacting the $SO_2$ containing gas with an aqueous solution of dimethyl sulfoxide while maintaining the pH of the aqueous solution acidic to dissolve $SO_2$ in the aqueous solution of dimethyl sulfoxide and thereafter reacting the dissolved $SO_2$ with alkaline earth metal ions to form a solid alkaline earth sulfate or a solid alkaline earth sulfite or mixtures thereof.

2. The method of claim 1, wherein the alkaline earth metal ions are calcium ions or magnesium ions from cement waste material.

3. The method of claim 2, wherein the calcium ions are from limestone.

4. The method of claim 1, wherein the gas containing the $SO_2$ is from the combustion of sulfur containing fossil fuels.

5. The method of claim 4, wherein the concention of dimethyl sulfoxide in the aqueous solution is in the range of from about 2% to about 70% by weight.

6. The method of claim 5, wherein the temperature of the aqueous solution of dimethyl sulfoxide is maintained in the range of from about ambient temperature to about 100° C.

7. The method of claim 4, wherein the pH of the aqueous solution of dimethyl sulfoxide is maintained in the range of from about 2 to less than 7.

8. The method of claim 7, wherein the pH is maintained at about 5.

9. A method of removing $CO_2$ from a gas, comprising contacting the $CO_2$ containing gas with an aqueous solution of dimethyl sulfoxide while maintaining the pH of the aqueous solution basic to dissolve $CO_2$ in the aqueous solution of dimethyl sulfoxide, and reacting the dissolved $CO_2$ with alkaline earth metal ions to form solid alkaline earth $CO_3$.

10. The method of claim 9, wherein the pH of the aqueous solution of dimethyl sulfoxide is maintained in the range of from about 7.1 to about 12.

11. The method of claim 9, wherein the pH of the aqueous solution of dimethyl sulfoxide is maintained about 8 to about 9.

12. The method of claim 9, wherein the concentration of dimethyl sulfoxide present in the aqueous solution is in the range of from about 2 to about 70% by weight.

13. The method of claim 12, wherein the dimethyl sulfoxide is present in a concentration of about 10% by weight.

14. A method of removing $SO_2$ and $CO_2$ from a gas containing $CO_2$ and $SO_2$, comprising contacting the gas containing $CO_2$ and $SO_2$ with an aqueous solution of dimethyl sulfoxide at a pH less than 7 to dissolve $SO_2$ in the aqueous dimethyl sulfoxide solution, reacting the dissolved $SO_2$ with alkaline earth metal ions to form solid alkaline earth sulfate or alkaline earth sulfite or mixtures thereof, separating solid alkaline earth sulfate or alkaline earth sulfite from the aqueous dimethyl sulfoxide, thereafter contacting the gas containing $CO_2$ with an aqueous solution containing dimethyl sulfoxide at a pH greater than 7 to dissolve $CO_2$ in the solution containing aqueous dimethyl sulfoxide contacting, the dissolved $CO_2$ reacting with alkaline earth metal ions to form solid alkaline earth $CO_3$, and separating solid alkaline earth carbonate from the solution.

15. The method of claim 14, wherein the concentration of dimethyl sulfoxide in aqueous solution is in the range of from abut 2% to about 70% by weight.

16. The method of claim 15, wherein the temperature of the aqueous solutions of DMSO is maintained in the range of from about ambient temperature to about 100° C.

17. The method of claim 16, wherein the alkaline earth metal ions are calcium ions or magnesium ions from cement waste material.

18. The method of claim 17, wherein the calcium ions are from limestone.

19. The method of claim 18, wherein the gas containing the $SO_2$ is from the combustion of fossil fuels.

20. The method of claim 19, wherein the pH of the dimethyl sulfoxide solution used to dissolve $SO_2$ is maintained from about 2 to less than 7.

21. The method of claim 20, wherein the pH of the dimethyl sulfoxide solution used to dissolve $CO_2$ is maintained in the range of from greater than 7 to about 12.

22. The method of 2 claim 21, wherein the pH of the dimethyl sulfoxide solution used to dissolve $CO_2$ is maintained between about 8 and about 9.

23. The method of claim 20, wherein the pH of the dimethyl sulfoxide solution used to dissolve $SO_2$ is maintained to about 5.

* * * * *

UNITED STATES PATENT AND TRADEMARK OFFICE
CERTIFICATE OF CORRECTION

PATENT NO. : 6,187,277 B1
DATED : February 13, 2001
INVENTOR(S) : Leon Kirschner Page 1 of 1

It is certified that error appears in the above-identified patent and that said Letters Patent is hereby corrected as shown below:

Column 11, claim 14,
Line 16, after "earth" but before "and" delete "$CO_3$," and insert -- carbonate --

Column 11, claim 16,
Line 22, before "aqueous" delete "the"

Column 12, claim 22,
Line 15, after "of" but before "claim" delete "2"

Signed and Sealed this

Thirteenth Day of November, 2001

*Attest:*

Nicholas P. Godici

NICHOLAS P. GODICI
*Attesting Officer*     *Acting Director of the United States Patent and Trademark Office*